United States Patent [19]

Vaughan et al.

[11] Patent Number: 4,933,161
[45] Date of Patent: Jun. 12, 1990

[54] TIN SUBSTITUTION INTO ZEOLITE FRAMEWORKS

[75] Inventors: David E. W. Vaughan, Flemington; Stephen B. Rice, Bloomsbury, both of N.J.

[73] Assignee: Exxon Research and Engineering Company, Florham Park, N.J.

[21] Appl. No.: 304,863

[22] Filed: Jan. 31, 1989

Related U.S. Application Data

[63] Continuation of Ser. No. 14,202, Feb. 4, 1987, abandoned, which is a continuation of Ser. No. 728,498, Apr. 29, 1985, abandoned.

[51] Int. Cl.$^5$ ............................................. C01B 33/28
[52] U.S. Cl. .................................... 423/328; 423/118; 423/618
[58] Field of Search ............... 423/326, 328, 329, 331, 423/332, 118, 618

[56] References Cited

U.S. PATENT DOCUMENTS

| | | | |
|---|---|---|---|
| 3,941,871 | 3/1976 | Dwyer et al. | 423/328 T |
| 4,101,417 | 7/1978 | Mitchell | 502/38 |
| 4,104,320 | 8/1978 | Bernard et al. | 423/328 |
| 4,329,328 | 5/1982 | McAnespie | 423/326 |
| 4,394,300 | 7/1983 | Chu et al. | 502/77 |
| 4,503,023 | 3/1985 | Breck et al. | 423/328 |
| 4,576,805 | 3/1986 | Chang et al. | 423/326 |

FOREIGN PATENT DOCUMENTS

| | | | |
|---|---|---|---|
| 57-7817 | 1/1982 | Japan | 423/328 T |
| 57-7818 | 1/1982 | Japan | 423/328 T |
| 2024790 | 1/1980 | United Kingdom | 423/328 |

Primary Examiner—John Doll
Assistant Examiner—R. Bruce Breneman
Attorney, Agent, or Firm—Ronald D. Hantman

[57] ABSTRACT

This invention relates to novel zeolitic compositions having tin substituted into the framework positions and a method for their preparation. The process of preparation more specifically involves hydrothermally treating aluminosilicate silica zeolite in the presence of tin compounds.

7 Claims, 4 Drawing Sheets

X-RAY DIFFRACTION ANALYSIS OF MODIFIED FAUJASITE

X-RAY DIFFRACTION ANALYSIS OF MODIFIED FAUJASITE
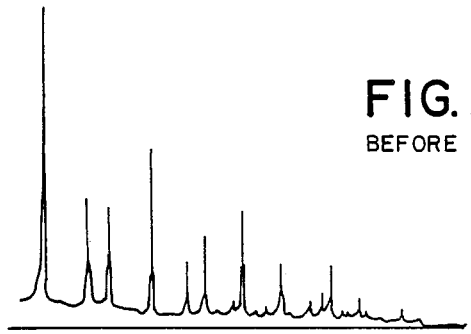
FIG. IA
BEFORE TREATMENT
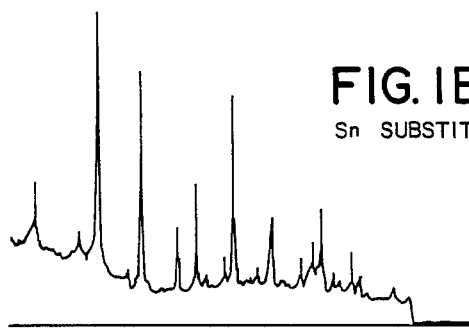
FIG. IB
Sn SUBSTITUTED, WITH AlCl$_3$
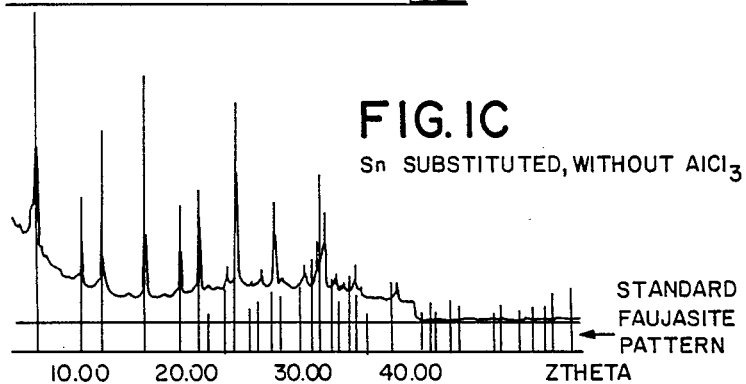
FIG. IC
Sn SUBSTITUTED, WITHOUT AlCl$_3$
STANDARD FAUJASITE PATTERN

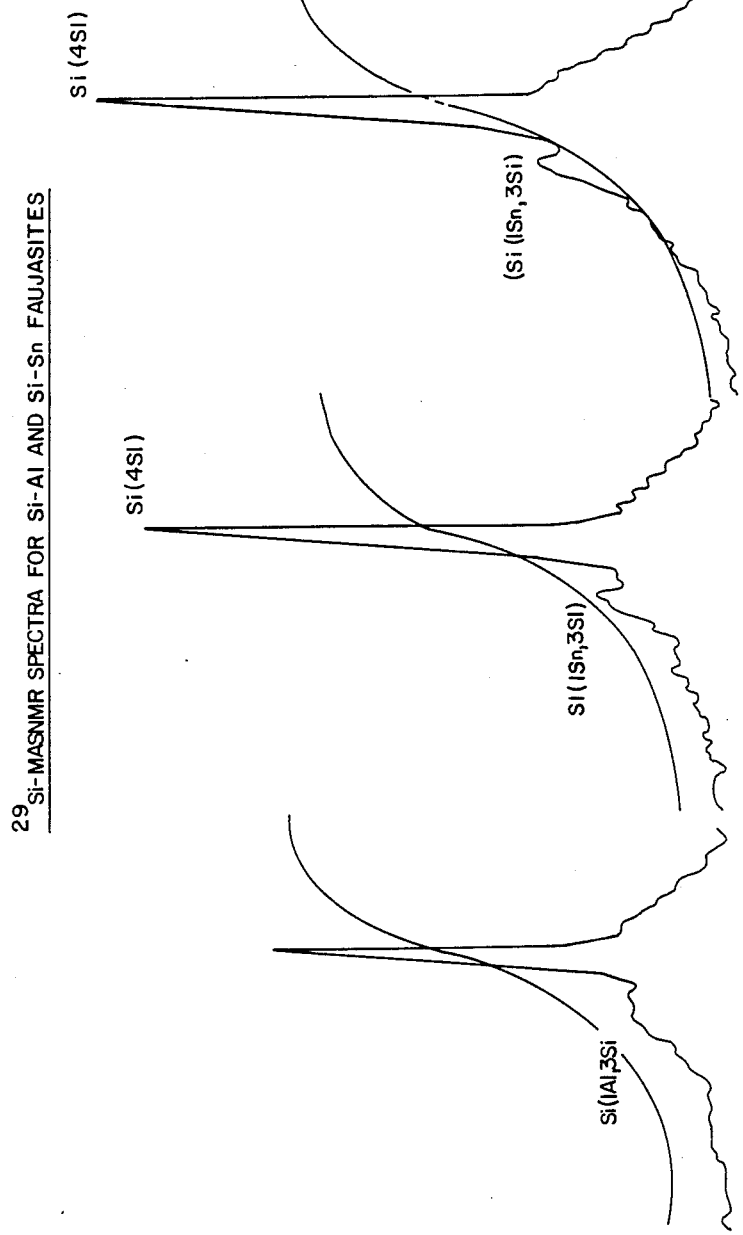

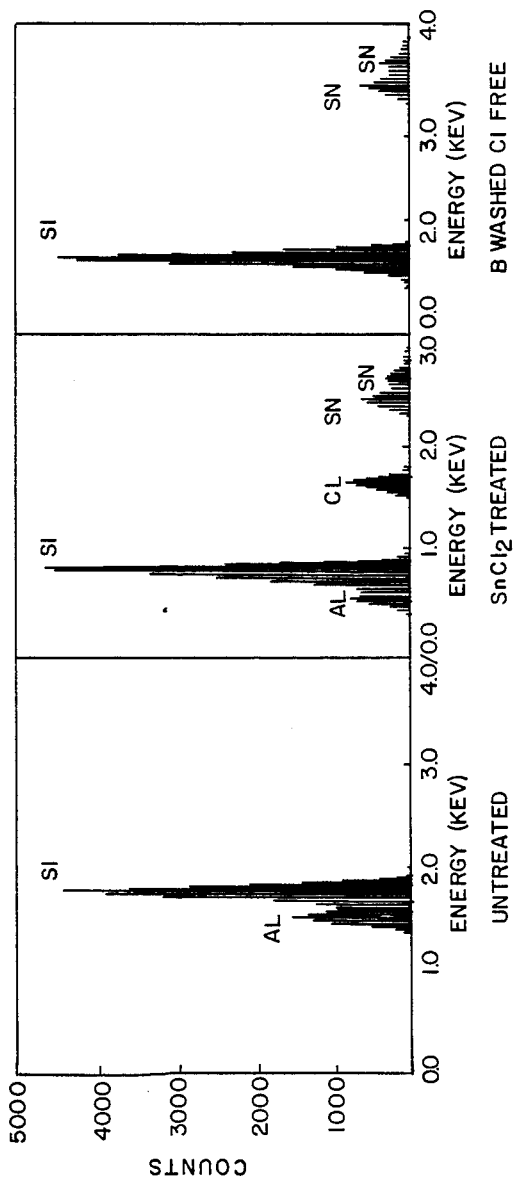

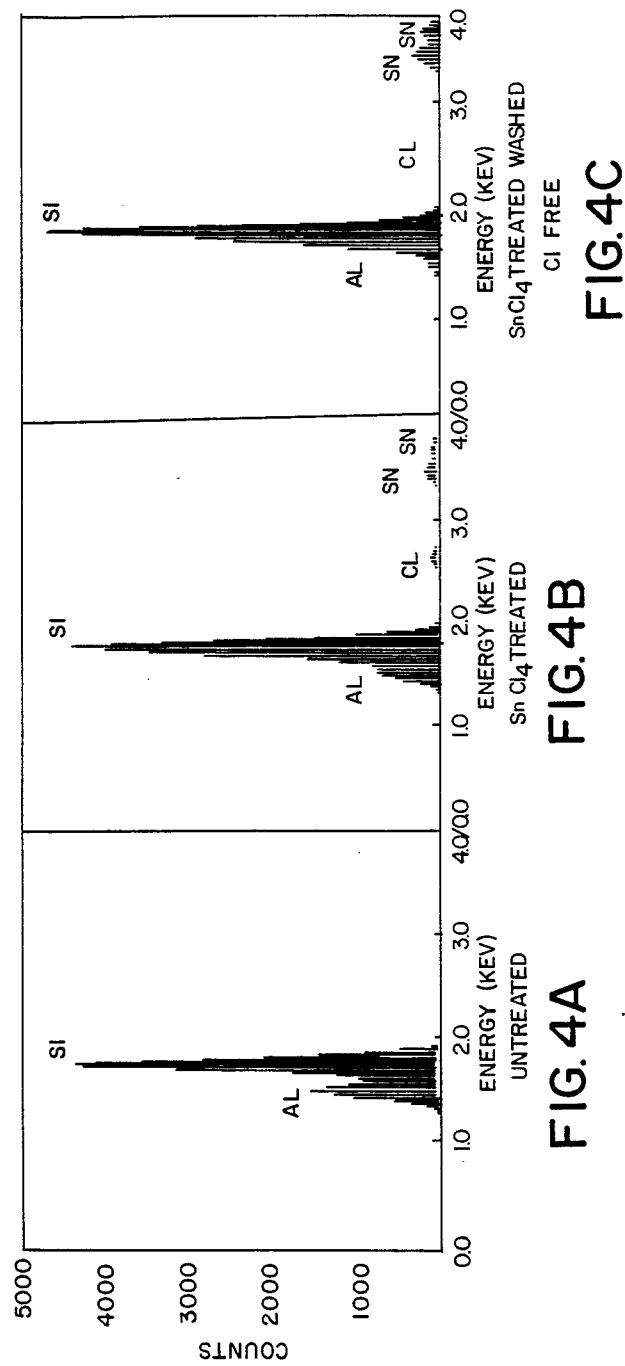

TIN SUBSTITUTION INTO ZEOLITE FRAMEWORKS

This application is a continuation of application Ser. No. 014,202, filed 2/4/87, now abandoned, which is a continuation of application Ser. No. 728,498, filed 4/29/85, now abandoned,

FIELD OF THE INVENTION

This invention relates to a method for the preparation of novel zeolitic compositions having tin substituted into the framework tetrahedral positions. The process of preparation more specifically involves hydrothermally treating aluminosilicate or silicate zeolites in the presence of tin compounds.

BACKGROUND OF THE INVENTION

Zeolites typically are crystalline hydrated aluminosilicates of Group I and Group II elements. In particular, those elements include sodium, potassium, calcium, magnesium, barium and strontium. The structure of zeolite is typically an aluminosilicate framework based on an indefinitely extending three dimensional network of $AlO_4$ and $SiO_4$ tetrahedra linked to each other by sharing of the oxygens. Zeolites are often represented by the empirical formula $M_{2/n}O \cdot Al_2O_3 \cdot x\ SiO_2 \cdot y\ H_2O$. In this oxide formula, "x" is generally greater or equal to 2 since $AlO_4$ tetrahedra are joined only to $SiO_4$ tetrahedra, and "n" is the Group I or Group II cation valence. The framework contains channels and interconnected voids which may be occupied by the cation and water molecules. The cations are often quite mobile and may be exchanged by other cations. Intracrystalline zeolitic water may be reversibly removed. In some zeolites, cation exchange or dehydration may produce structural changes in the framework. It is known that gallium ions and silicon ions may to some limited extent be substituted for aluminum cations in the framework. Germanium has similarly reportedly been substituted into the zeolitic framework.

Much zeolite research has been focused on the synthesis of zeolite frameworks containing elements other than silicon and aluminum. While an extensive family of aluminum-phosphorus zeolites has recently been synthesized, the substitution of other elements is the subject of major controversy in the zeolite literature. For instance, U.S. Pat. Nos. 3,329,480 and 3,329,481 both issued to D. A. Young, report the existence of crystalline zirconosilicate and titanosilicate zeolites. A zeolite having chromium in the tetrahedral positions has been described by Yermolenko et al at the Second Oil Union Conference on Zeolites, Leningrad, 1964, pages 171-8 (published 1965). However, D. W. Breck in Zeolite Molecular Sieves, p. 322, John Wiley & Sons (1974) suggests that the chromium present was not present in a zeolite A structure and furthermore was present as an impurity in insoluble form. The impurity was said to be in the form of a chromium silicate as confirmed by the nature of the water vapor adsorption isotherm. The overall status of tetrahedral substitution has recently been reviewed by Barrer in "Hydrothermal Chemistry of Zeolites", Academic Press (1982), Chapter 6.

Because of the presence of phosphorus in tetrahedral $PO_4$ units in certain rare zeolites, extensive work has been done to synthesize zeolites containing $PO_4$ tetrahedra. Various phosphorus containing zeolites have been prepared as reported in Breck, supra, p. 323 et seq. The synthesis technique for production of phosphorus-containing zeolites generally involves crystallization from a gel in which the phosphorus is first incorporated by a controlled copolymerization in co-precipitation of all of the component oxides in the framework, i.e., aluminate, silicate, and phosphate in the homogeneous gel phase. The crystallization of the gel is then carried out at a temperature between 80 and 210° C.

The chemical treatment of zeolites with silicon tetrachloride and tetrafluoride has been demonstrated as a very successful method of replacing $Al^{3+}$ with $Si^{4+}$ in zeolite frameworks. Major literature has developed around this phenomenon since it was first reported by Beyer and Belenykaja, ("Catalysis by Zeolites" No. 5, Editor B. Imelik et al, (1980), Elsevere Press). Experiments with tin tetrachloride reported in the same volume by Otsuka et al produce no evidence for inclusion of the tin into the zeolitic framework and reported only low temperature adsorption of small amounts of tin tetrachloride and the resultant effect of that compound on catalytic activity. Otsuka's experiments were aimed at evaluating the particular zeolite as a support for the strong Lewis acid tin tetrachloride.

Inclusion of tin into zeolites for one reason or another is known. For instance, U.S. Pat. No. 3,013,987 to Castor et al, issued Dec. 19, 1961, suggests the adsorption of various elemental transition metals, including tin, into such large pore zeolites as natural faujasite and synthetic zeolites X, Y, and L. The process is accomplished by either adsorbing organometallic species with the dehydrated zeolite or by solution adsorption of similar soluble species. Tin, an element of Group IV A, is preferably reacted as a tin alkyl. After introduction of the metal-containing compound to the zeolite, the compound is broken down by, e.g., reduction with hydrogen, to effect the deposition of elemental metal.

U.S. Pat. No. 3,200,082 to Breck et al, issued Aug. 10, 1965, has the similar objective of occluding reduced metal in the zeolite voids. Therein, it is suggested that the incorporation of metal into the particular zeolitic molecular sieves is limited by the extent to which the molecular sieves may be ionexchanged with the desired cations. Consequently, both Castor et al and Breck et al are considered to teach only processes and compositions in which the included tin is found in the sorption or ion-exchangeable sites and not in the tetrahedral framework itself.

U.S. Pat. No. 3,600,301 to Rausch, issued Aug. 17, 1971, discloses a catalytic composite material used in hydrocarbon hydroprocessing. Tin and a Group VIII noble metal component are introduced into a porous carrier material, preferably crystalline zeolite. The various methods include coprecipitation or co-gellation of the tin containing material with a carrier material. A further method includes impregnation of the carrier zeolite with a tin-containing compound. Regardless of the manner by which the tin and other components are added to the carrier material, the final composite generally is said to be dried at a temperature of about 200° F. to about 600° F. for a period of 2 to about 24 hours or more and finally calcined at a temperature of about 700° F. to about 1100° F. for a period less than about 10 hours in order to convert the metallic components contained therein to the oxide form. The objective is said to be to deposit the metal within the void volume of the zeolite or on its surface.

None of this literature appears to disclose either a zeolite which contains tin in its framework structure or suggests any processes for attaining such composition.

SUMMARY OF THE INVENTION

This invention deals with a composition of matter comprising a large or intermediate pore aluminosilicate or silica zeolite having tin substituted into a zeolite framework. Suitable host zeolites include any known large pore zeolite, especially Type A, faujasites (such as type X and Y, ZSM-4, ZSM-5, ZSM-11, ZSM-12, Type L, offretite, Type omega or mazzite types, Type Beta, chabazite, CSZ-1, high silica ZK4, mordenite, ferrierite and various Si/Al ratio faujasites having different cation contents. A preferred host zeolite is a high silica dealuminated faujasite.

The process for producing the composition involves moderate temperature hydrothermal treatment using a tin compound in an acidic medium for an appropriate but effective length of time. The product zeolite is then filtered and washed to remove extraneous tin reactant or by-products.

BRIEF DESCRIPTION OF THE DRAWINGS

FIGS. 1A, 1B, and 1C compare the X-ray diffraction patterns of faujasites variously before treatment and after treatment according to the invention.

FIGS. 2A, 2B and 2C show the differences in $^{29}$Si-MASNMR spectra for those faujasites.

FIGS. 3A, 3B, and 3C show electron microprobe chemical analyses of an untreated faujasite, tin chloride treated high silica faujasite, and the treated faujasite after washing to remove chloride. These materials are discussed in Example 1.

FIGS. 4A, 4B and 4C show microprobe analyses similar to those in FIGS. 3A, 3B and 3C for the Example 2 material.

DESCRIPTION OF THE PREFERRED EMBODIMENTS

The invention herein is generically crystalline zeolite having at least some tin within the zeolitic aluminosilicate or silicate framework. Desirably, the host zeolite may be forms of Type A, faujasites (such as Types Y and X), ZSM-4, ZSM-5, ZSM-8, ZSM-11, ZSM-12, Type L, offretite, Type omega or mazzite, Type Beta, chabazite, CSZ-1, high silica ZK4, and various Si/Al ratio faujasites having different cation contents. The more desirable compositions of matter have a faujasite structure in a chemical composition range:

(1−a) x AlO$_2$:a SnO$_2$:5-200 SiO$_2$ where a=0.2 to 1.0, and X represents H+ in most cases but may be other the cations, e.g., sodium, potassium, magnesium, calcium, strontium, barium, lithium or ammonium.

The tin substituted zeolites may be produced by a moderate temperature hydrothermal process utilizing a tin compound. There is some evidence that hydroxyl groups known to be found within the zeolite can be reacted with AlCl$_3$ and the resulting Al$^{3+}$ annealed into the framework tetrahedral positions. See Dessau and Kerr, Zeolites, 4, p. 315 (1984). While not wishing to be bound by theory, it appears that using the inventive process, zeolites containing some aluminum in framework positions can be reacted with tin compounds under the acidic hydrothermal conditions to replace some or all of the Al$^{3+}$ with the Sn$^{4+}$ in the tetrahedral sites. Dealuminated materials, e.g., faujasites probably also have some concentration of "hydroxyl nests" (see Barrer and Makki, 1964), and these also probably react to permit migration of Sn$^{4+}$ into the tetrahedral vacancies.

In any event, the process of this invention involves treating one of the host zeolites mentioned above with a tin-bearing compound under acidic hydrothermal conditions so as to replace at least a portion of the framework aluminum with tin. Since the reacting tin compound is acidic, the higher silica-containing materials yield products of highest retained crystallinity. Prior dealumination or silication may therefore be desirable in some instances. An especially suitable tin compound is tin chloride. Hydrochloric acid is suitable as acidifying agent when used with a chloride-containing tin compound. After mixture of the zeolite with the appropriate tin compound, the mixture is transferred to an autoclave and treated at a moderate temperature, e.g., 100° to about 220° C., under autogenous pressure. Desired temperatures are 130° C. to 165° C. Treatment time is not particularly critical, but should be sufficiently long to allow the desired extent of reaction to take place. One to five hours, preferably two to four hours, is reasonably sufficient. Complete replacement of Al$^{3+}$ by Sn$^{4+}$ will result in a neutral framework having no cation exchange capacity. It may, of course, be desirable to change only a portion of the Al$^{3+}$ and leave the zeolite with some cation exchange capacity and thereby allow the tin substituted zeolite to be further ion exchanged with a catalytic metal of some kind. Such a partially exchanged composition is suitable for a support in, for instance, a bifunctional catalyst.

The compositions disclosed herein may contain some waters of hydration which may be at least partially removed when the zeolites are subsequently employed as catalysts or sorbents. In addition, when the aluminum in the framework is only partially replaced by tin, the resulting cation exchange sites may be subjected to ion exchange with a solution containing various cations such as hydrogen, ammonium, metal cations from Groups I to VIII of the Periodic Table, or mixtures thereof, to provide a material suitable for catalytic conversion of hydrocarbons such as, e.g., paraffin isomerization, aromatization, alkylation, catalytic cracking, hydrocracking or the like, or suitable for sorption. The class of zeolites disclosed herein is expected to have different catalytic adsorption properties as compared with the corresponding aluminosilicates. In addition, this class of zeolites is expected to have novel hydrocarbon conversion selectivities, ion exchange, and gas separation properties simply because the presence of tin in the zeolitic framework will influence support interactions with deposited metals, exchange cation and reactants.

The examples which follow illustrate the invention. In all examples, parts and percentages are given by weight and temperatures in degrees Centigrade unless otherwise noted. These examples are presented for the purposes of demonstration and are not intended to be limiting of the invention in any fashion.

EXAMPLE 1

A 2 gm sample of a high silica dealuminated faujasite ELZ-20 (Union Carbide Corporation) was reacted with 3.7 gms of SnCl$_2$.2H$_2$O and 0.62 gm of HCl at 145° C. in a Teflon lined autoclave for two days. The resulting product was filtered and washed with 50 gms of water.

FIG. 1A shows an X-ray diffraction pattern for the faujasite before treatment. FIG. 1B shows the X-ray diffraction pattern of the resulting product. That and the electron microprobe analysis in FIG. 3A (untreated zeolite) and 3B (after $SnCl_2$ treatment) show that the resulting material was quite similar to the original ELZ-20, but with appreciable tin and chloride included. The $^{29}$Si-MASNMR(major angle spinning nuclear magnetic resonance) spectra as shown in FIGS. 3A and 3B shows essentially no change in the spectrum. The washed material was then reslurried with about 150 gms of water at 60° C. for 1 hr, filtered, and washed until the filtrate tested chloride-free with an $AgNO_3$ solution. Microprobe analysis (FIG. 1C) now shows the material to contain only silicon and tin, and the X-ray diffraction analysis (FIG. 1C) shows good crystallinity retention but major peak intensity changes compared to FIG. 1A or FIG. 1B. Analysis of the washed and slurried product by $^{29}$Si-MASNMR is (as shown in FIGS. 2A, 2B and 2C) essentially identical to the original ELZ-20 in showing a peak at −102.5 ppm (vs. TMS) presumably associated with Si(1Sn) and Si(1Al). Compared to the Si(4Si) peak at −107.9 ppm, the smaller peak had a relative intensity of about 20%. This represents a faujasite having an Si/Sn ratio of about 22. In comparison, electron microprobe analysis gave an Si/Sn ratio of 9.3 and an Si/Al ratio of 21.5. Consequently, it is clear that a significant portion of the aluminum has been replaced by tin. As can be seen by comparing FIG. 1A with FIG. 1C, except for some relative intensity changes, and a shift toward a slightly larger unit cell for the 1C material, the x-ray diffraction patterns are essentially the same. Little, if any, indication of structure degradation is found. The stoichiometry of the final product is:

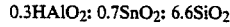

EXAMPLE 2

A 2 gm sample of a faujasite (ELZ-20-Union Carbide Corp.) was intimately mixed with 5.6 gm of $SnCL_4.5H_2O$ and and 1 gm of $H_2O$. Electron microprobe analysis of the initial ELZ-20 material is shown in FIG. 4A. The mixture was placed into a 25 ml. Teflon-lined autoclave and reacted in an air oven at 160° C. After quenching to room temperature, the zeolite product was washed and filtered. The product was highly crystalline, as shown by x-ray diffraction analysis, and provided the microprobe analysis shown in FIG. 4B. The sample was then refluxed in deionized water for one hour, filtered and washed with 50 gm $H_2O$ at 80° C. The microprobe analysis of this sample is shown in FIG. 4C.

The initial material shown in FIGS. 4A had an Si/Al ratio of about 2.1, the material in FIG. 4B had an Si/Al ratio of about 4.5 (although various particles in the sample gave Si/Al ratio as high as 12 indicating variable washing affects); the thoroughly washed material in FIG. 4C had an Si/Al cation of about 1 and all detrital chloride was removed. The washed sample had Si/Sn analysis of about 19. The product stoichiometry was therefore:

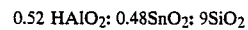

Having thus described the invention and provided examples thereof, it should be apparent to those having ordinary skill in this art that obvious variations of the composition and the process of making those compositions would be within the scope of this invention as claimed below.

We claim as our invention:

1. The process for the production of a faujasite zeolite containing tin in its tetrahedral framework having the chemical composition:

where a=0.2 to 0.7 and X is a charge balancing cation, said process comprising the steps of hydrothermally treating a host zeolite having an Si/Al ratio of about 5 to 200, in an acid medium captable of dealuminizing the zeolite, which acid medium contains a tin compound, which treating is conducted at a temperature from about 100-220° C. and for a time sufficient to produce a zeolite having tin in the tetrahedral framework.

2. The process of claim 1 wherein the temperature is between about 130° C. and 165° C.

3. The process of claim 1 wherein the tin compound is tin dichloride.

4. The process of claim 3 wherein the medium is rendered acidic by the addition of hydrochloric acid.

5. The process of claim 1 wherein the time and temperature are sufficient to substitute tin partially for any aluminum contained within the zeolitic framework.

6. The process of claim 1 wherein the time and temperature are selected to substitute tin substantiate completely within the framework.

7. The process of claim 1 additionally including the steps of washing and recovering the tin containing zeolite.

* * * * *